US012014616B2

(12) United States Patent
Schulz et al.

(10) Patent No.: US 12,014,616 B2
(45) Date of Patent: Jun. 18, 2024

(54) SYSTEM AND METHOD FOR GENERATING AN ALERT BASED ON NOISE

(71) Applicant: NoiseAware Inc., Dallas, TX (US)

(72) Inventors: Andrew Schulz, Dallas, TX (US); David Krauss, Dallas, TX (US)

(73) Assignee: NoiseAware Inc., Dallas, TX (US)

( * ) Notice: Subject to any disclaimer, the term of this patent is extended or adjusted under 35 U.S.C. 154(b) by 0 days.

(21) Appl. No.: 18/338,106

(22) Filed: Jun. 20, 2023

(65) Prior Publication Data

US 2023/0334973 A1 Oct. 19, 2023

Related U.S. Application Data

(63) Continuation of application No. 17/217,860, filed on Mar. 30, 2021, now Pat. No. 11,682,286, which is a continuation of application No. 16/559,462, filed on Sep. 3, 2019, now Pat. No. 10,964,194, which is a continuation of application No. 15/968,486, filed on May 1, 2018, now Pat. No. 10,403,118, which is a continuation of application No. 15/342,734, filed on Nov. 3, 2016, now Pat. No. 9,959,737.

(60) Provisional application No. 62/331,183, filed on May 3, 2016, provisional application No. 62/250,340, filed on Nov. 3, 2015.

(51) Int. Cl.

| | |
|---|---|
| ***G08B 21/18*** | (2006.01) |
| ***G08B 23/00*** | (2006.01) |
| ***H04R 29/00*** | (2006.01) |
| *G08B 25/00* | (2006.01) |
| *H04R 3/00* | (2006.01) |

(52) U.S. Cl.
CPC .......... *G08B 21/182* (2013.01); *G08B 23/00* (2013.01); *H04R 29/00* (2013.01); *G08B 25/006* (2013.01); *H04R 3/00* (2013.01); *H04R 2410/00* (2013.01)

(58) Field of Classification Search
CPC ...... G08B 21/182; G08B 23/00; G08B 21/18; H04R 29/00
See application file for complete search history.

(56) References Cited

U.S. PATENT DOCUMENTS

| | | | | |
|---|---|---|---|---|
| 9,936,357 | B2 | 4/2018 | Mills et al. | |
| 2010/0142715 | A1 | 6/2010 | Goldstein et al. | |
| 2015/0278690 | A1* | 10/2015 | Bialk | G16H 40/20 702/56 |
| 2015/0347079 | A1 | 12/2015 | Price et al. | |
| 2016/0163168 | A1 | 6/2016 | Brav et al. | |
| 2016/0173049 | A1 | 6/2016 | Mehta | |
| 2016/0178392 | A1 | 6/2016 | Goldfain | |
| 2016/0286327 | A1 | 9/2016 | Marten | |

(Continued)

*Primary Examiner* — Olisa Anwah

(57) ABSTRACT

The disclosure relates to using anonymized audio data for monitoring properties. Disclosed herein are monitoring systems for properties and a method of monitoring properties. One example of a method of monitoring a property includes: (1) deriving at least one raw signal from noise proximate one or more noise detectors at the property, (2) generating a noise score from the at least one raw signal, the noise score being insufficient to reproduce a content of the raw signal, and (3) generating, based on the noise score and at least one or more other factors, a risk score for the property that has a value representing a risk of damage to the property, wherein the factors include an expected occupancy at the property and reservation data for the property.

20 Claims, 4 Drawing Sheets

(56) References Cited

U.S. PATENT DOCUMENTS

| | | | |
|---|---|---|---|
| 2016/0367190 | A1 | 12/2016 | Vaitaitis |
| 2017/0124847 | A1 | 5/2017 | Schulz et al. |
| 2017/0125034 | A1 | 5/2017 | Kakadiaris et al. |

* cited by examiner

SYSTEM AND METHOD FOR GENERATING AN ALERT BASED ON NOISE

CROSS-REFERENCE TO RELATED APPLICATION

This application is a continuation of U.S. Pat. No. 17,217,860, filed by Schulz, et al., on Mar. 30, 2021, entitled "SYSTEM AND METHOD FOR GENERATING AN ALERT BASED ON NOISE", which is a continuation of U.S. application Ser. No. 16/559,462, filed by Schulz, et al., on Sep. 3, 2019, entitled "SYSTEM AND METHOD FOR GENERATING AN ALERT BASED ON NOISE" which is a continuation of U.S. application Ser. No. 15/968,486, filed by Schulz, et al., on May 1, 2018, now issued U.S. Pat. No. 10,403,118 issued Sep. 3, 2019, which is a continuation of U.S. application Ser. No. 15/342,734, filed by Schulz, et al., on Nov. 3, 2016, now issued U.S. Pat. No. 9,959,737 issued May 1, 2018, which claims benefit of U.S. Provisional Application Ser. No. 62/250,340, filed by Krauss, et al., on Nov. 3, 2015, and U.S. Provisional Application Ser. No. 62/331,183, filed by Schulz, et al., on May 3, 2016, all of which are commonly assigned with this application and incorporated herein by reference in their entirety.

TECHNICAL FIELD

This application is directed, in general, to identification of noise risk and, more specifically, to a system and method for generating an alert based on noise.

BACKGROUND

Online, peer-to-peer homestay networks enable people to list and rent short-term lodging in residential properties. According to the business model, a long-term occupant of a given property (the "host") advertises the property and sets the rental fee, and the host and the short-term renter (the "guest") share the cost the homestay network charges for their service. Not only have guests benefited from relatively inexpensive, attractive and unique properties, hosts have benefited from much-welcomed, supplemental income. While Airbnb® is currently the best-known of the homestay networks, many others exist, and more are sure to be coming into the market given their popularity.

Despite wide adoption, homestay networks have experienced some issues. Alleged discriminatory practices by hosts have raised fair housing concerns. Financial, tax and legal liabilities have yet to be fully settled among hosts and guests. Terms of use have created substantial angst over privacy and freedom to contract. However, the issue that has garnered the most attention in the media has been property misuse incidents. Hardly a week goes by without another story of property damage, vandalism or theft resulting from over occupancy or immoderate parties, noise complaints from pets or loud music or inappropriate use, e.g., drug dealing or pornographic moviemaking.

Despite these ongoing issues, homestay networks appear to be here to stay and still offer hosts and guests an attractive cash flow and alternative to more traditional lodging options.

SUMMARY

In one aspect, the disclosure provides a method of monitoring a property. In one example the method includes: (1) deriving at least one raw signal from noise proximate one or more noise detectors at the property, (2) generating a noise score from the at least one raw signal, the noise score being insufficient to reproduce a content of the raw signal, and (3) generating, based on the noise score and at least one or more other factors, a risk score for the property that has a value representing a risk of damage to the property, wherein the factors include an expected occupancy at the property and reservation data for the property.

In another aspect, the disclosure provides a monitoring system for a property. In one example the monitoring system includes: (1) multiple noise detectors located with a building of the property, wherein each of the multiple noise detectors derive a raw signal from noise proximate thereof, and (2) a processor configured to generate a noise score for each of the multiple noise detectors using the associated raw signal and, based on the noise scores and at least one or more other factors, a risk score for the property that has a value representing a risk of damage to the building, wherein the factors include an expected occupancy of the building, an estimated occupancy of the building, and reservation data for the building.

In still another aspect, the disclosure provides another monitoring system for a property. In one example the other monitoring system includes: (1) multiple noise detectors located with a building of the property, wherein each of the multiple noise detectors derive a raw signal from noise proximate thereof, and (2) a processor configured to generate a noise score for each of the multiple noise detectors using the associated raw signal and, based on the noise scores and at least one or more other factors, a risk score for the property that has a value representing a risk of damage to the building, wherein the factors include an expected occupancy of the building, an estimated occupancy of the building, and reservation data for the building.

BRIEF DESCRIPTION

Reference is now made to the following descriptions taken in conjunction with the accompanying drawings, in which.

DETAILED DESCRIPTION

Figure 1:
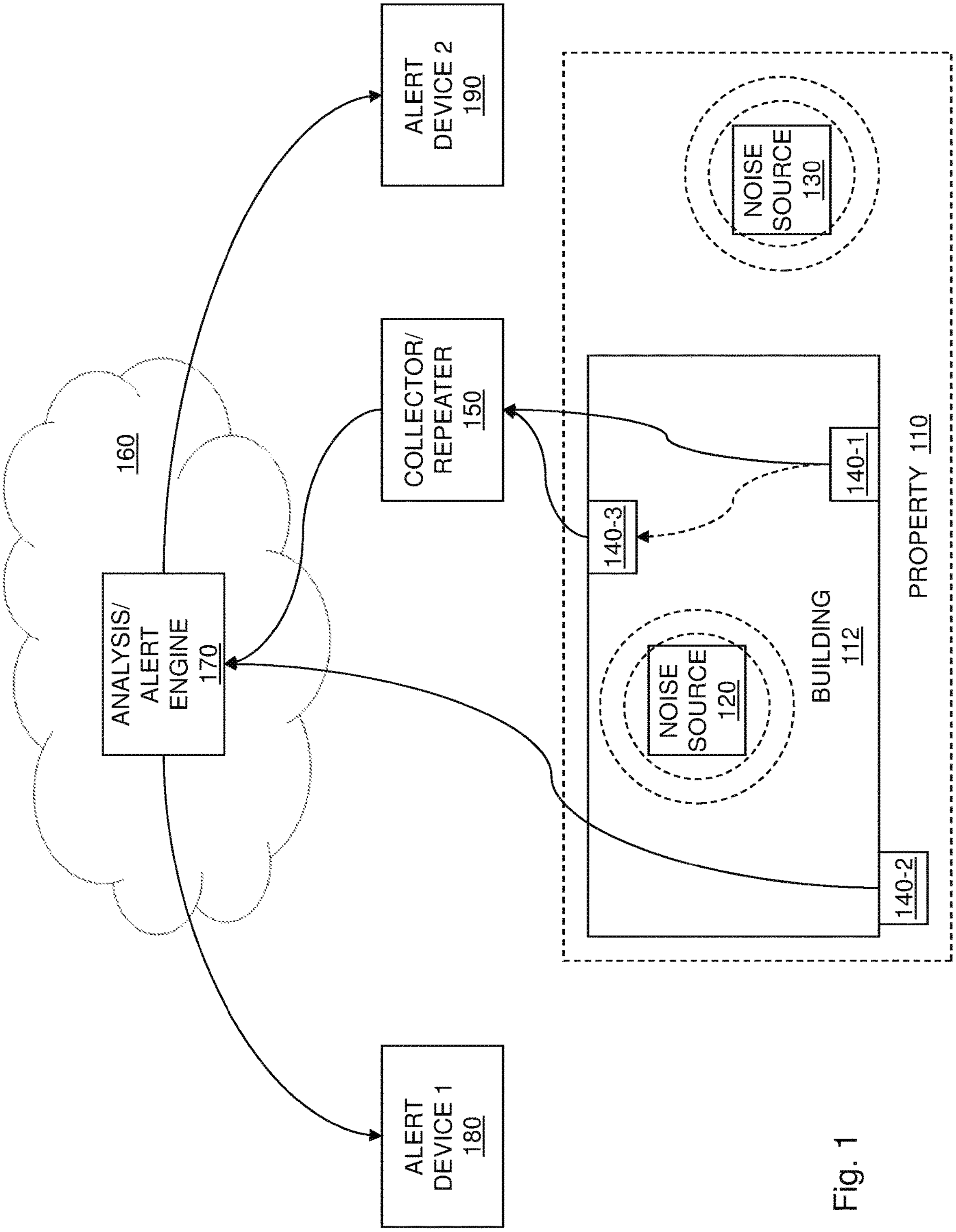
FIG. 1 is a high-level diagram of one embodiment of a system for generating an alert based on noise located in an example operating environment.

As stated above, hosts have been forced to deal with, and often pay for, and pay fines for, property damage, vandalism and theft resulting from over occupancy or immoderate parties, noise complaints from pets or loud music or inappropriate use of their property. It is realized herein that unusual patterns of noise often accompany these destructive, harmful, and sometimes illegal, behaviors and that electronic eavesdropping could prove valuable in intercepting and bringing to a halt such behaviors. It is further realized herein bringing a halt to such behaviors may include notifying responsible persons or authorities. However, it is also realized herein that, not only would guests find electronic eavesdropping unacceptable, and most hosts would be loath to eavesdrop on their guests, but federal and state laws prohibit electronic eavesdropping. Therefore, it is realized herein that a need exists for a way to identify and alert hosts to the existence of noise, which is regarded herein as reliable evidence of offending behavior, at their properties that represent a risk without allowing the hosts to listen to the sounds (which may be thought of as auditory "content") being generated at their properties. Stated another way, what is needed in the art is a system and method for monitoring and generating alerts based on noise that involve measuring sounds without transmitting sounds, including the sounds that constitute the noise, i.e. eavesdropping. The system and method provide a non-reversible, "anonymizing" function for converting sound into data that can be employed to identify noise risk but cannot be employed to eavesdrop.

Introduced herein are various embodiments of systems and method for generating alerts based on noise. Such systems allow hosts to be alerted of risks to the well-being of their property that arise from inappropriate or excessive noise without compromising the privacy of guests engaged in behavior that does not present a risk justifying an alert.

In various embodiments, the system and method described herein may be employed to identify indoor gatherings of people. In various other embodiments, the system and method described herein may be employed to modify audible human behavior based on anonymized audio feedback loop and alerting. In still further embodiments, the system and method described herein may be employed to abate noise nuisance conditions, including electronically amplified sounds, e.g., music, construction activity, e.g., power tools, or animal noises.

The anonymized audio can be combined with other data to identify and alert on meaningful events at a property. The anonymized audio can be combined with weather data, date, time of day, guest check-in, guest check-out, party size, age of guest(s), city(ies) of origin for guest(s), nearby attractions and events, number of rooms in the property, square footage of the property, and/or any other factors determined relevant to create a value to represent a disruption, a noise level, and an activity level. The other data combined with the anonymized audio can be data from sensors, such as a wireless device detector. The wireless device detector can be a media access control (Mac) address sniffer that scans and finds MAC addresses.

In one specific embodiment, a noise detector includes a standard microphone or waterproof microphone coupled to a processor. The processor is configured to convert samples of the microphone output into a noise score. These noise score is then transmitted, e.g., wirelessly, through a network to an analysis/alert engine, where it is used, perhaps in the aggregate with other noise scores, to determine if an alert should be generated and, if so, to characterize the type of disturbance that has occurred. Other types of alerts can be given, for example, if the noise detector loses power for any reason or a wireless network connection is lost. Hosts can set up who receives the alerts. Alerts may then be routed to the delegated parties via Short Message Service (SMS), electronic mail, push notification or phone call. Certain embodiments of the noise detector include a light that may flash to provide a visual warning or a speaker that may sound to provide an audible warning.

Hosts can use a World Wide Web portal to set up any quiet hours that may be desired for a given property, a time period threshold that a noise disturbance would have to exceed to trigger an alert and an amplitude threshold that would determine what constitutes a "loud" sample.

In certain embodiments, the noise detector may include other environmental sensors, e.g., for: wireless network signals, barometric pressure, temperature, light, smoke, particulates, noxious gas (e.g., carbon monoxide) and motion detection. In some embodiments, noise detectors are able to detect the sound produced by conventional smoke and carbon monoxide detectors. In other embodiments, noise detectors are able to detect doorbells, car horns, breaking glass and animal sounds, such as dogs barking. The sensor for wireless network signals can be a wireless device detector. A processor of the noise detector can be configured, i.e., designed and constructed, to combine detected noise with data from the wireless device detector to provide over-occupancy protection. For example, the processor can be configured to consider an estimated number of people based on a number of wireless device addresses detected at the property, a number of people on a reservation at the property, and the noise score to determine if the estimated number of people on the property (e.g., a statistical guess) corresponds to the number of people expected at the property according to the reservation. If not, or if not within a determined threshold, then an alert can be sent.

The processor can also be configured to combine the detected noise with property reservation data and the changes in the observed wireless device addresses to determine if travelers have entered or left the property. A model can be generated to predict such events given the standardization of check in and check out events, a return to silence or ambient sound level that uniquely corresponds to a location of the noise detector, and a reduction in the number of wireless device addresses, e.g., reduced to zero wireless device addresses.

FIG. 1 is a high-level diagram of one embodiment of a system for generating an alert based on noise located in an example operating environment. In the embodiment of FIG. 1, the operating environment includes a property 110 having a building 112 located thereon. In one embodiment, the building 112 is a single-family home. In another embodiment, the building 112 is a multiple-family home. In yet another embodiment, the building 112 is an apartment or condominium that is part of a larger structure. In still another embodiment, the building 112 is a room, suite or apartment in a dormitory, hotel, hospital, rehabilitation center, long-term care center or skilled nursing facility. In yet still another embodiment, the building 112 is a commercial or industrial space, such as a storefront, warehouse or factory. Those skilled in the art will readily see that the building 112 may be any structure within any space in or at which noise detection may be needed or desired.

FIG. 1 specifically illustrates a situation, purely for purposes of discussion, in which the property has two noise sources 120, 130 associated with it. One noise source 120 is within the building 112, and the other noise source 130 is located on the property 110 outside the building 112. Both noise sources 120, 130 are assumed to be such that they create noise in the building 112, on the property 110 around the building 112 and outside the property (unreferenced).

It should be noted that one or more noise detectors may be employed to monitor outdoor environments, whether or not a building is present. Specifically, outdoor noise monitoring on the façade of a building as well as at the property line may be advantageous. Monitoring for construction site nuisance noise or violations of air rights or after-hours use or noise (e.g., in a park) may also be advantageous.

The property 110 is illustrated as having at least one noise detector associated with it. In the embodiment of FIG. 1, three noise detectors 140-1, 140-2, 140-3 are located in or around the building 112. One noise detector, e.g., the noise detector 140-1 or the noise detector 140-2, may be sufficient to provide noise protection, but, as will be understood, multiple noise detectors can be employed to advantage in some embodiments. Each noise detector 140-1, 140-2, 140-3 is coupled directly or indirectly (e.g., via another noise detector or a collector/repeater 150) to a network 160. The network 160 is represented in FIG. 1 as a "cloud" of data processing, storage and communication hardware and software, as is familiar to those skilled in the pertinent art.

An analysis/alert engine 170 is coupled to the network 160 for communication therewith. The analysis/alert engine 170 is further coupled to at least one alert device. FIG. 1 shows, as an example, two alert devices: alert device 1 180 and alert device 2 190.

In the illustrated embodiment, at least one of the alert device 1 180 and the alert device 2 190 is a mobile device, e.g., a smartphone. The alert may take the form of a telephone call, an electronic mail message, a text message or any other form of alert suitable to warn a host of a noise risk with respect to the host's property. The alert may be of the existence of a noise risk, without more. Alternatively, the alert may include a characterization of the noise risk, e.g., breaking glass, loud talking, loud television or stereo or barking dog. The host can then take various steps to abate the noise risk, including contacting the guest, contacting neighbors, contacting a leasing agent, or contacting the authorities. Alternatively, the host may ignore the alert.

In an alternative embodiment, the alert dispatched by the analysis/alert engine 170 may be to the guest to warn the guest of the presence of a noise risk. In one specific embodiment, the guest may be warned before the host by providing multiple thresholds: a lower one to trigger a guest warning, and a higher one to trigger a host warning. A still higher threshold could be used to notify authorities directly without relying on the host to notify the authorities. This stratified scheme gives the guest an opportunity to correct behavior before stronger measures are taken. Certain embodiments provide closed-loop control of noise sources. For example, an alert may be generated that causes a particular noise source to attenuate (e.g., a television to turn its volume down) or turn off without human intervention. Related embodiments provide a monitoring system that can automatically turn down (and maybe electronically limit, by rule) the volume of a television or stereo who quiet hours begin.

In operation, the noise detectors 140-1, 140-2, 140-3 are configured to generate noise scores over time and transmit them directly, via each other, or via the collector/repeater 150, to the network 160 and eventually the analysis/alert engine 170. The analysis/alert engine 170 is configured to determine, based at least in part on the noise scores, whether and when to generate alerts and the alert device to which to send given alerts. Evaluation of the noise scores may involve noise scores from one noise detector or noise scores from multiple noise detectors, analyzed in concert to gain additional insight.

Important to the system of FIG. 1 are the noise detectors 140-1, 140-2, 140-3. At a high level, each noise detector may be regarded as being like a smoke detector: small, unremarkable in appearance, tending to blend into surroundings, but reliable, efficient and effective in the function they perform. However, this need not be the case. In certain embodiments, the noise detectors are readily visible to encourage vigilance with respect to noise and may include flashing lights or speakers to provide alerts directly to guests.

Figure 2:
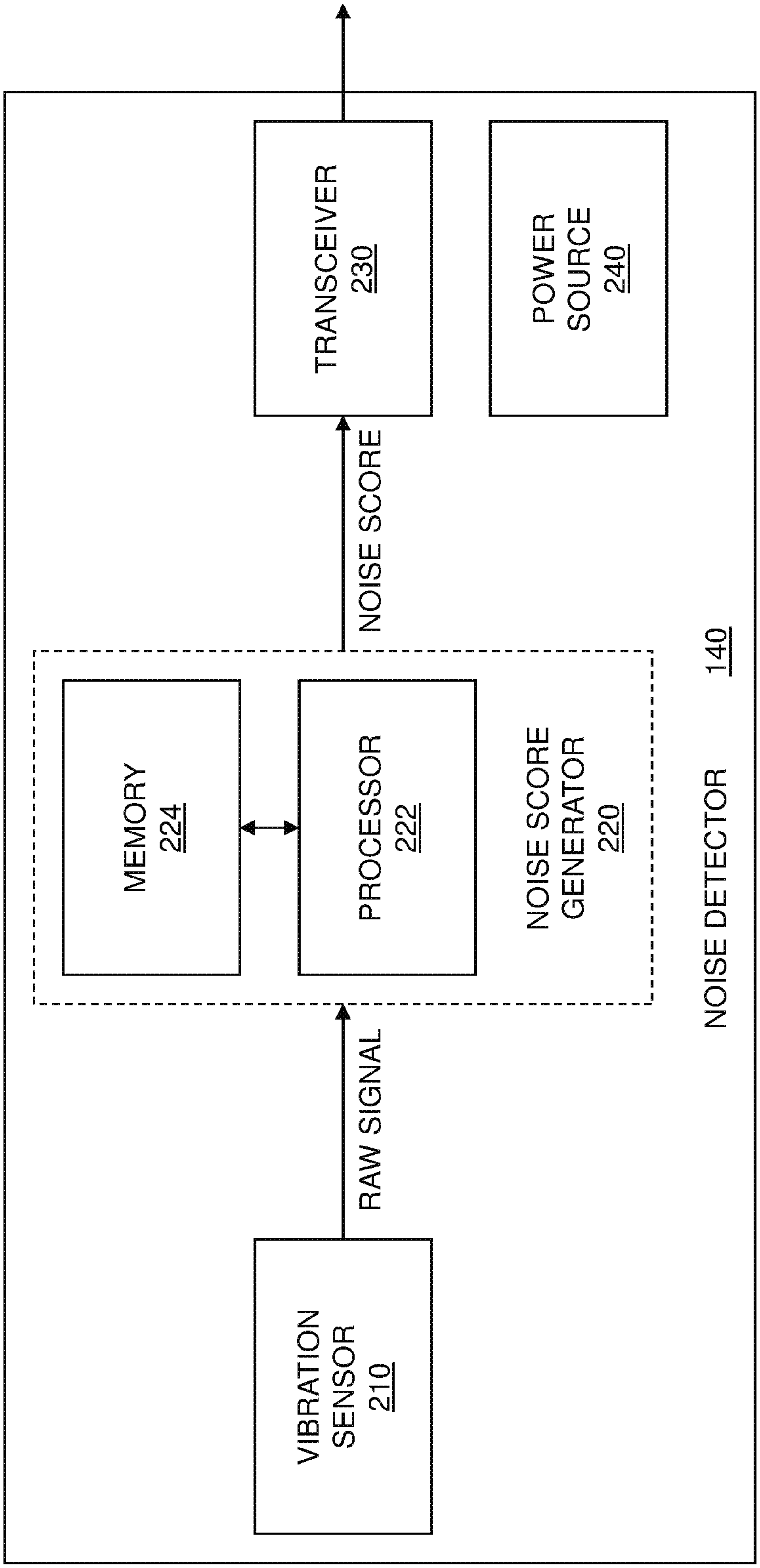
FIG. 2 is a block diagram of one embodiment of a noise detector.

FIG. 2 is a block diagram of one embodiment of a noise detector 140 (e.g., the noise detector 140-1 of FIG. 1). The illustrated embodiment of the noise detector 140 includes a vibration sensor 210. The vibration sensor 210 is configured to derive a raw signal from noise proximate the noise detector 140. In one embodiment, the vibration sensor 210 is an acoustic sensor, and particularly a microphone. In various embodiments, the microphone is selected from the group consisting of: condenser, fiber optic, carbon, electromagnetic, electret, ribbon and laser. In other embodiments, the vibration sensor 210 is a piezoelectric sensor.

The illustrated embodiment of the noise detector 140 also includes a noise score generator 220. The noise score generator 220 is illustrated as having a processor 222 and a memory 224. The noise score generator 220 is coupled to the vibration sensor 210 and configured to generate a noise score from the raw signal. In accordance with the statements made above, the noise score is insufficient to reproduce a content of the raw signal. "Content" is defined for purposes of this disclosure as auditory information that may be heard (e.g., speech or music) corresponding to that which a noise detector received from its surroundings. Noise scores are not "content;" thus, electronic eavesdropping using the noise score itself is impossible.

In one embodiment, the noise score is a number based on at least two of: an amplitude of a noise event captured in the raw signal, a frequency content of the noise event and a period of time. In another embodiment, the memory 224 is configured to contain at least one threshold for comparison with the raw signal. In one specific embodiment, the noise score is the total number of times the amplitude of the raw signal exceeds a threshold amplitude during a given period of time.

In the illustrated embodiment, the processor 222 is further configured to generate a time stamp and an identifying number corresponding to the noise detector 140. The time stamp indicates the time to which the noise score pertains, and the identifying number differentiates the noise scores generated by one noise detector from those generated by another noise detector.

The noise detector 200 can include additional sensors with the vibration sensor 210. For example, a wireless device detector that finds proximate wireless devices, such as via MAC addresses. The processor 222 can be configured to employ data determined by the wireless device detector with the noise scores to estimate occupancy on the property and determine when people enter and leave the property. The processor 222 can also receive reservation data and employ this information with the wireless device detector and noise scores to estimate over-occupancy (e.g., estimated occupancy compared to guests on the reservation), and assist in determining when people check-in to the property and check-out of the property. In some embodiments, processor 322 of FIG. 3 may be configured to receive the reservation data, the wireless device detector data, and the noise scores and estimate occupancy and when people enter or exit the property.

The illustrated embodiment of the noise detector 140 further includes a transceiver 230. The transceiver 230 is coupled to the noise score generator 220 and is configured to transmit the noise score to a network (e.g., the network 160 of FIG. 1). Other embodiments employ a transmitter in lieu of the transceiver 230 to transmit the noise score to a network. In various embodiments, the transceiver 230 is selected from the group consisting of: WiFi, cell (e.g., GSM, CDMA), Zigbee/Zwave, mesh, Low Power, Wide Area, LoRa®, LPWAN, power line, infrared and ultrasonic).

The illustrated embodiment of the noise detector 140 further includes a power source 240 coupled to the noise score generator 220 and the transceiver 230. In one embodiment, the power source 240 is or includes a battery. Other conventional or later-developed power sources are employed in alternative embodiments. In an alternative embodiment, the power source 240 includes a power converter configured to convert power to a voltage appropriate for the noise detector 140. The latter embodiment allows the noise detector 140 to be plugged into a standard power outlet.

Figure 3:
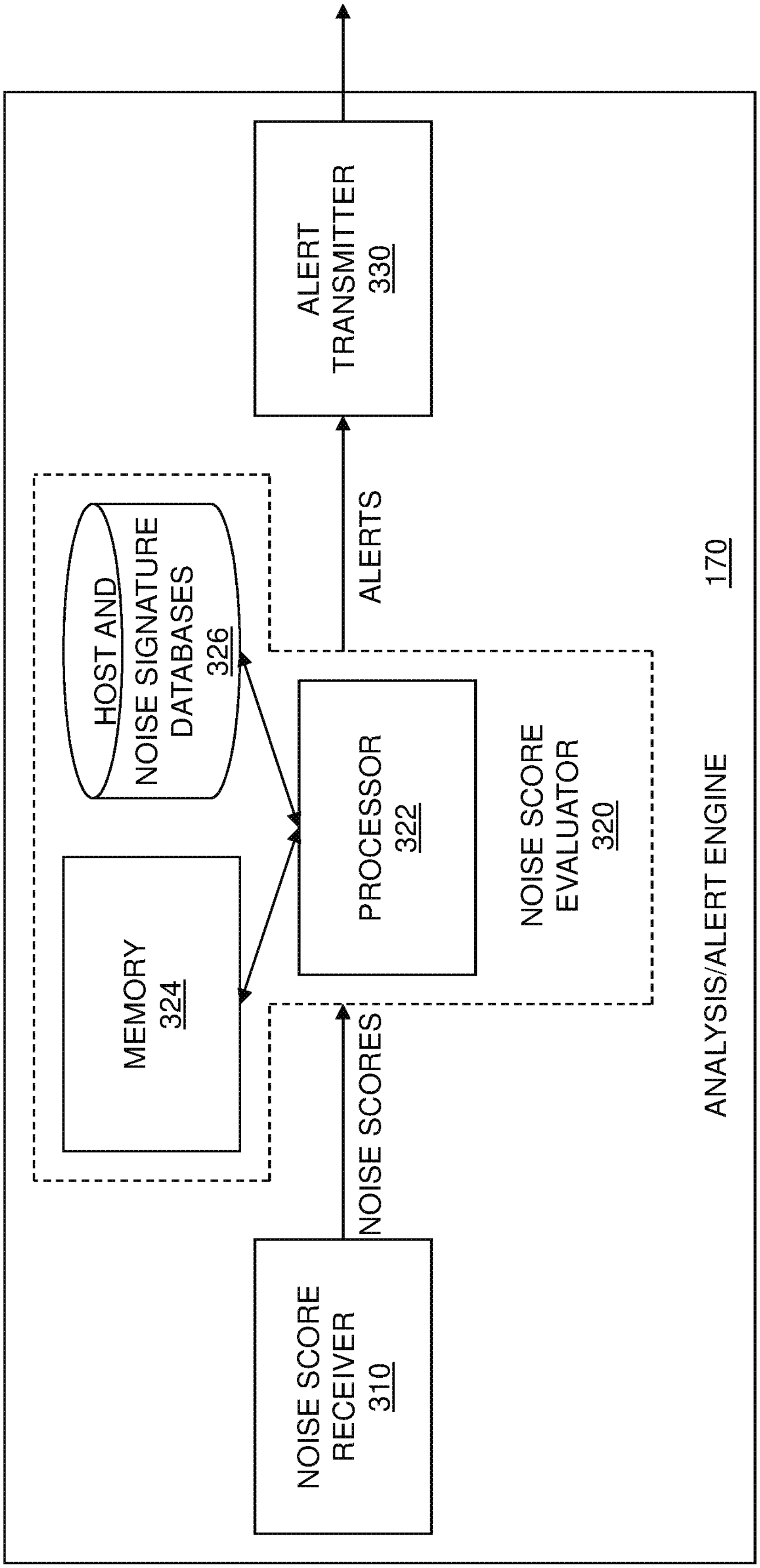
FIG. 3 is a block diagram of one embodiment of an analysis/alert engine.

As stated above, noise scores from multiple noise detectors may be transmitted to an analysis/alert engine that analyzes the noise scores to determine whether they merit the generation of alerts and the destination of any alerts that may be generated. FIG. 3 is a block diagram of one embodiment of an analysis/alert engine 170. The illustrated embodiment takes the form of a server, though other forms fall within the broad scope of the invention.

The illustrated embodiment of the analysis/alert engine 170 includes a noise score receiver 310. The noise score receiver 310 is couplable to a network, e.g., the network 160 of FIG. 1, and is configured to receive from the network at least one noise score from at least one noise detector. The illustrated embodiment of the analysis/alert engine 170 is more specifically configured to receive from the network and over time many noise scores from many noise detectors associated with many properties having corresponding hosts.

The illustrated embodiment of the analysis/alert engine 170 also includes a noise score evaluator 320. The illustrated embodiment of the noise score evaluator 320 has a processor 322 and a memory 324. The noise score evaluator further has host and noise signature databases 326. The noise signature database is configured to allow the noise score evaluator 320 to evaluate and characterize the at least one noise score to determine if the at least one noise score should cause an alert to be generated. In some embodiments, the noise signature database allows the noise score evaluator 320 to make an educated guess as to type of noise risk that is reflected in the noise scores, e.g., breaking glass, loud talking, loud television or stereo or barking dog. Other noise signatures may merit an alert as well, e.g., low sounds levels, deviations from steady state sound levels, natural frequency deviations, repetitive sounds, frequency triggers, particular words or word phrases or occupancy/vacancy. Each of these is expected to have a different and distinguishable effect on noise scores, assuming the noise scores are designed appropriately.

The host database is configured to allow the noise score evaluator 326 to determine the destination alert device that is appropriate for the alert (typically, but not necessarily, the alert device associated with the host of the property associated with the noise detector that generated the noise scores that gave rise to the alert). In certain embodiments, the host database also includes thresholds corresponding to noise detectors associated with the hosts and their respective properties.

The different thresholds allow different standards of what constitutes acceptable amounts and types of sound versus unacceptable amounts and levels of noise to be applied to each noise detector, and by extension to each property, separately. Accordingly, the illustrated embodiment of the noise score receiver 310 is further configured to receive a time stamp and an identifying number corresponding to the noise detector, employ the time stamp to evaluate the at least one noise score and employ the identifying number to identify the destination alert device. In related embodiments, the evaluating performed by the noise score evaluator 320 includes comparing multiple of the at least one noise score using time stamps associated therewith.

The illustrated embodiment of the analysis/alert engine 170 further includes an alert transmitter 330 associated with the noise score evaluator 320. The alert transmitter 330 is configured to transmit an alert to the destination alert device (e.g., the alert device 1 180 and/or the alert device 2 190 of FIG. 1).

Figure 4:
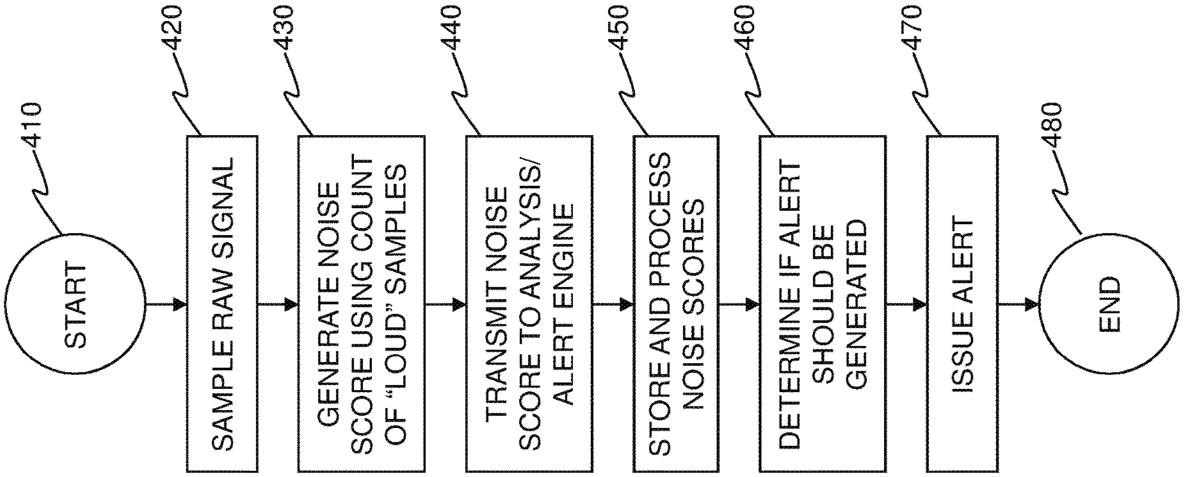
FIG. 4 is a flow diagram of one embodiment of a method of detecting noise.

FIG. 4 is a flow diagram of one embodiment of a method of detecting noise. The method begins in a start step 410, when power is provided to a noise detector using a power source contained in a noise detector. In a step 420, a raw signal, e.g., an acoustic signal, derived from noise proximate a noise detector is sampled. In various embodiments, different physical properties of the raw signal are measured, e.g., voltage, current and power.

A time stamp and an identifying number corresponding to a noise detector carrying out the step 420 may be generated as well. In a step 430, a noise score is generated from the raw signal, the noise score being insufficient to reproduce a content of the raw signal. In one embodiment, the noise score is generated by counting the number of "loud" samples, i.e. samples having a value exceeding an amplitude threshold. This involves a process of comparing at least one threshold with the raw signal. Other embodiments generate noise scores using other metrics, such as mathematically related measures or groups of measures. The generating of the step 430, may be carried out by basing the noise score on at least two of the following three metrics: (1) an amplitude of a noise event captured in the raw signal, (2) a frequency content of the noise event and (3) a period of time.

In a step 440, the noise score is transmitted toward an analysis/alert engine for further processing. This usually involves first transmitting the noise score to a network. In a step 450, noise scores received by the analysis/alert engine are stored in a memory and processed in a processor. In a step 460, it is determined whether an alert should be generated based on one or more processed noise scores. In a step 470, an alert is issued if the determination of the step 460 is positive. The method ends in an end step 470.

Those skilled in the art to which this application relates will appreciate that other and further additions, deletions, substitutions and modifications may be made to the described embodiments.

What is claimed is:

1. A method of monitoring a property, comprising:

deriving at least one raw signal from noise proximate one or more noise detectors at the property;

generating a noise score from the at least one raw signal, the noise score being insufficient to reproduce a content of the raw signal; and generating, based on the noise score and at least one or more other factors, a risk score for the property that has a value representing a risk of damage to the property, wherein the factors include an expected occupancy at the property and reservation data for the property.

2. The method as recited in claim 1, further comprising estimating the occupancy of the property using the one or more noise detectors and obtaining the reservation data for the property.

3. The method as recited in claim 2, wherein the estimating includes detecting a number of wireless devices for the location using the one or more noise detectors.

4. The method as recited in claim 1, wherein the factors further include weather data for the property.

5. The method as recited in claim 1, wherein the factors further include property characteristics.

6. The method as recited in claim 1, further comprising characterizing a basis of the risk of damage to the property using the noise score.

7. The method as recited in claim 1, wherein the other factors include at least two of the expected occupancy at the property, the reservation data for the property, weather data for the property, an estimated occupancy at the property, and property characteristics.

8. The method as recited in claim 7, wherein the other factors further include a noise score from an additional one of the one or more noise detectors at the property.

9. The method as recited in claim 8, further comprising characterizing a basis of the risk of damage to the property considering the noise score and the at least two other factors.

10. The method as recited in claim 1, wherein the property includes a hotel and the one or more noise detectors are located with the hotel.

11. The method as recited in claim 1, wherein the property includes a multi-unit dwelling and the one or more noise detectors are located with the multi-unit dwelling.

12. A monitoring system for a property, comprising:

multiple noise detectors located with a building of the property, wherein each of the multiple noise detectors derive a raw signal from noise proximate thereof; and a processor configured to generate a noise score for each of the multiple noise detectors using the associated raw signal and, based on the noise scores and at least one or more other factors, a risk score for the property that has a value representing a risk of damage to the building, wherein the factors include an expected occupancy of the building, an estimated occupancy of the building, and reservation data for the building.

13. The monitoring system as recited in claim 12, wherein the building is a multi-unit dwelling or hotel.

14. The monitoring system as recited in claim 12, wherein the factors further include weather data for the property.

15. The monitoring system as recited in claim 12, wherein the factors further include characteristics on the building.

16. The monitoring system as recited in claim 12, wherein the processor is further configured to characterize a basis of the risk of damage to the building using the noise score.

17. The monitoring system as recited in claim 12, wherein one or more of the multiple noise detectors are located within the building.

18. A method of monitoring a property, comprising:

deriving at least one raw signal from noise proximate one or more noise detectors at the property;

generating a noise score from the at least one raw signal, the noise score being insufficient to reproduce a content of the raw signal; and identifying a level of noise risk associated with the property using the noise score, a frequency associated with the raw signal, construction characteristics of the property, and locations of the one or more noise detectors within the property.

19. The method of monitoring as recited in claim 18, wherein the deriving includes deriving at least one raw signal for multiple ones of the one or more noise detectors and generating a noise score from each raw signal, wherein the identifying includes using each of the noise scores.

20. The method of monitoring as recited in claim 19, wherein the property includes a building that is a hotel or a multi-dwelling unit and the multiple ones of the one or more noise detectors are located with the building.

* * * * *